US008257450B2

(12) United States Patent
Aradi et al.

(10) Patent No.: US 8,257,450 B2
(45) Date of Patent: Sep. 4, 2012

(54) MANGANESE COMPOUNDS TO INHIBIT BOTH LOW-AND HIGH-TEMPERATURE CORROSION IN UTILITY AND INDUSTRIAL FURNACE SYSTEMS

(75) Inventors: Allen A. Aradi, Richmond, VA (US); Michael Wayne Adams, Midlothian, VA (US); Stephen Alan Factor, Richmond, VA (US)

(73) Assignee: Afton Chemical Intangibles LLC, Richmond, VA (US)

( * ) Notice: Subject to any disclaimer, the term of this patent is extended or adjusted under 35 U.S.C. 154(b) by 1695 days.

(21) Appl. No.: 10/322,158

(22) Filed: Dec. 18, 2002

(65) Prior Publication Data
US 2004/0118032 A1 Jun. 24, 2004

(51) Int. Cl.
*C10L 1/18* (2006.01)
(52) U.S. Cl. .......................................................... 44/359
(58) Field of Classification Search .................. 44/354, 44/355, 358, 359, 362, 363, 365, 366
See application file for complete search history.

(56) References Cited

U.S. PATENT DOCUMENTS

| | | | |
|---|---|---|---|
| 2,943,925 A | 5/1960 | Ambrose | |
| 3,443,916 A | 5/1969 | Rolfe | |
| 3,692,503 A | 9/1972 | Kukin | |
| 3,837,820 A | 9/1974 | Kukin | |
| 4,035,530 A * | 7/1977 | Stoldt | 427/252 |
| 4,512,774 A | 4/1985 | Myers et al. | |
| 5,525,127 A * | 6/1996 | Jeffrey | 44/359 |
| 6,187,064 B1 | 2/2001 | Henderson | |
| 6,729,248 B2 * | 5/2004 | Johnson et al. | 110/342 |

FOREIGN PATENT DOCUMENTS

| | | |
|---|---|---|
| CA | 1067835 | 12/1979 |
| DE | 2809199 | 9/1979 |
| EP | 1215272 | 6/2002 |
| FR | 2502300 | 3/1981 |
| FR | 2 502 300 | 9/1982 |
| GB | 1061161 | 3/1967 |
| GB | 1189356 | 4/1970 |
| GB | 1 218 973 A | 1/1971 |
| WO | WO 87/00193 A | 1/1987 |

OTHER PUBLICATIONS

Partial European Search Report; Application No. 10158754.1-1270/2199374; Feb. 2, 2011; 10 pages.
European Office Action dated May 18, 2010 for European Patent Application No. 03 022 906.6-1270.

* cited by examiner

*Primary Examiner* — Cephia D Toomer
(74) *Attorney, Agent, or Firm* — Thomas & Karceski, P.C.

(57) ABSTRACT

The present invention relates to the reduction or inhibition of corrosion in an atmospheric burner unit by adding to a combustion system an effective amount of manganese, or a manganese precursor source, or derivative. The system may further include a catalyst package that may be composed of one or more individual organometallic compounds of Li, Na, K, Mg, Ca, Sr, Ba, Mo, Fe, Co, Pt, Ce, and combinations, mixtures or precursors thereof. The manganese component of the catalyst package of the present invention reduces or eliminates the poisoning of the combustion system, whereby improved combustion and reduced emissions result. In addition, this invention inhibits both high- and low-temperature corrosion that occurs on the hot surfaces of burner furnace walls and tubes, and on cooler surfaces of the burner unit exhaust stack.

3 Claims, 2 Drawing Sheets

Figure 1:
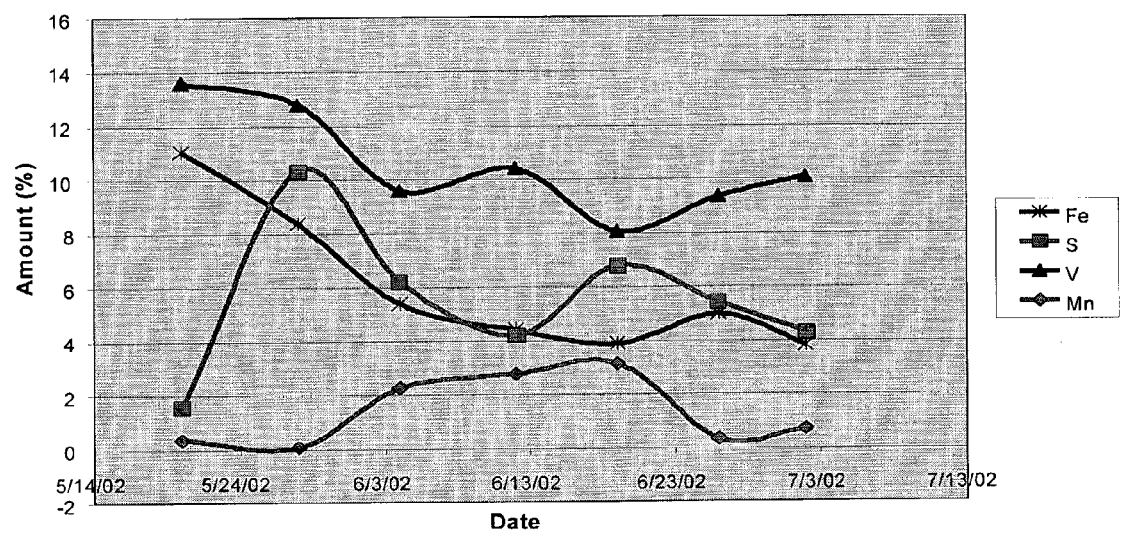

MANGANESE COMPOUNDS TO INHIBIT BOTH LOW-AND HIGH-TEMPERATURE CORROSION IN UTILITY AND INDUSTRIAL FURNACE SYSTEMS

FIELD OF THE INVENTION

The present invention relates to the reduction or inhibition of corrosion in an atmospheric burner unit by using a fuel-borne organometallic combustion system containing manganese, or a manganese precursor source, or derivative. The system may further contain a catalyst package that may be composed of one or more individual organometallic compounds of Li, Na, K, Mg, Ca, Sr, Ba, Mo, Fe, Co, Pt, Ce, and combinations, mixtures or precursors thereof. The manganese component of the catalyst package of the present invention reduces or eliminates the poisoning of the combustion system, whereby improved combustion and reduced emissions result. In addition, this invention serves a second purpose of lowering both high- and low-temperature corrosion that occurs on the hot surfaces of burner furnace walls and tubes, and on cooler surfaces of the burner unit exhaust stack.

BACKGROUND OF THE INVENTION

Fuel-borne organometallic combustion catalysts are becoming important in the control of environmental pollutants where fossil fuel is burned, for example, in internal combustion engines and in stationary burners such as those used in home heating, industrial furnaces, and steam power generators that burn fuel oil or coal. Organometallics derived from transition metals such as manganese, cerium, platinum, iron, and molybdenum; alkali metals such as lithium, sodium, and potassium; and alkaline earth metals such as calcium, magnesium, strontium and barium can all serve variously as effective fuel-borne emission control catalysts for controlling production of soot, smoke, hydrocarbon, carbon monoxide, sulfur trioxides, and oxides of nitrogen emissions. However, the vast majority of fossil fuels contain certain contaminant elements such as sulfur, phosphorus, vanadium, etc. that bind with these fuel-borne catalysts and inhibit them from efficiently performing their intended purpose. In addition, some combustion units are constructed with metals, such as iron, which can oxidize, corrode, or poison an emission control system.

High-temperature corrosion (above 400° C.) occurring on hot surfaces of the combustion unit is promoted by fuel contaminants such as sodium, vanadium and iron. This corrosion is promoted by oxygen near and on the surfaces in question. Sodium vanadate combustion products absorb this oxygen to form low-melting sodium vanadylvanadate fluxes that oxidatively corrode and physically erode the metal surface by forming a corrosive and free-flowing surface alloy with the metal. Fuels such as coal that have high levels of iron give an ash surface deposit whose fusion temperature falls with iron concentration increase in the fuel. The iron in effect lowers the fusion temperature of the slag, and just like the low melting sodium vanadylvanadate fluxes described above, this molten slag corrodes and erodes the metal surface in a similar manner.

Low-temperature corrosion (below 250° C.) can occur in the cooler region of a combustion unit towards the exhaust stack. Fuel sulfur, sodium, vanadium and iron can cause this corrosion. Sodium vanadylvanadates and iron, in the presence of oxygen, both independently catalyze conversion of $SO_2$ to $SO_3$ at high temperatures and the resulting $SO_3$ hydrates with combustion water at lower temperatures in the exhaust stack to give corrosive sulfuric acid. The key to both high- and low-temperature corrosion processes is availability of oxygen near species and surfaces capable of shunting it into the corroding surfaces. To avoid an expensive maintenance cost, corrosion must be inhibited or slowed down. It would therefore be desirable to scavenge the oxygen used to promote the corrosion.

Fuel-borne organometallic combustion and emissions control catalysts, such as those of cerium, platinum, manganese, and iron are used in engines and burners both to lower exhaust particulates, $NO_x$, hydrocarbon, etc, and as light-off catalysts for passive diesel particulate filters (DPFs), catalyzed diesel particulate filters (C-DPFs), and continuously regenerating technology diesel particulate filters (CRT-DPFs) used to filter particulate from the exhaust stream. The true efficiency of these catalytic additives is compromised by the presence in the fuel, or from the surfaces of the combustion unit, of certain metal contaminants with which these additives have to react first. In doing so, a portion of the catalytic activity of the additive is sacrificed and is no longer available to perform its intended task.

SUMMARY OF THE INVENTION

According to the present invention, manganese, when introduced in its various forms preferentially reacts with the fuel contaminants or surface contaminants thus allowing the respective organometallic catalyst to complete its intended emission control role more efficiently.

By the present invention, the manganese also scavenges oxygen away from critical surfaces and from species such as sodium vanadylvanadates, iron, platinum, etc that would otherwise utilize this oxygen to promote surface corrosion, and shunts this oxygen to the more desirable carbon oxidation reactions. The manganese in the catalyst package achieves this by reacting with this oxygen and using it to oxidize carbon, and carbon monoxide to carbon dioxide. The result is a significant reduction in corrosion of the surface areas of the combustion unit and its exhaust passageways.

In one embodiment of the present invention, it has thus been discovered that manganese in the fuel when admixed with fuel-borne organometallic catalysts preferentially reacts with certain contaminants in the fuel or otherwise introduced into the combustion, such as sulfur, vanadium, iron and phosphorus. The interaction between manganese and the fuel contaminant produces a non-poisoning environment in which it is ideal for the organometallic catalysts to effectively operate. The catalysts useful in the present invention can include one or more organometallic compounds of elements selected from the group consisting of Li, Na, K, Mg, Ca, Sr, Ba, Mo, Fe, Co, Pt, Ce, and combinations, mixtures, or precursors thereof.

In another embodiment is provided a method to inhibit corrosion of a combustion unit combusting a fuel, whereby the method includes adding to the combustion a corrosion-inhibiting amount of a manganese source.

By "interaction," "interacting," "interact" and "interacts" herein is meant scavenging.

By "scavenging" herein is meant the contacting, combining with, reacting, incorporating, chemically bonding with or to, physically bonding with or to, adhering to, agglomerating with, affixing, inactivating, rendering inert, consuming, alloying, gathering, cleansing, consuming, or any other way or means whereby a first material makes a second material unavailable or less available.

By "manganese" herein is meant any manganese or manganese-containing material, compound or precursor, such as but not limited to methyl cyclopentadienyl manganese tricarbonyl, available from Ethyl Corporation as MMT®, and manganese sulfonate, manganese phenate, manganese salicylate, cyclopentadienyl manganese tricarbonyl, alkyl cyclopentadienyl manganese tricarbonyl, organic manganese tricarbonyl derivatives, alkyl cyclopentadienyl manganese derivatives, bis-cyclopentadienyl manganese, bis-alkyl cyclopentandienyl manganese, neutral and overbased manganese salicylates, neutral and overbased manganese phenates, neutral and overbased manganese sulfonates, manganese carboxylates, and combinations and mixtures thereof.

Thus, in an embodiment the present invention provides a method to inhibit corrosion of a combustion unit combusting a fuel, said method comprising adding to the combustion a corrosion-inhibiting amount of a manganese source.

Thus, in an another embodiment the present invention provides a fuel-borne organometallic combustion system, containing a fuel and a catalyst package containing at least one metal source, and manganese as a co-catalyst, wherein the manganese in the system combines or interacts with at least one fuel contaminant selected from the group consisting of sulfur, phosphorus, vanadium, iron, and compounds thereof, and precursors thereof.

The contaminant, such as sulfur, vanadium, iron, phosphorus, and other elements and their precursors, can originate in or from the degradation of the steel or iron-containing structural units of the combustion unit and/or its exhaust passageways. The contaminant can also find its way into the combustion system of the present invention by or from any other means or sources, such as but not limited to combustion aids and adjuvants, lubricants, in the fuel source, such as is often found in crude fuel, tar sands, coal or still bottoms, and air.

By "combustion unit" herein is meant any and all internal and external combustion devices, machines, boilers, furnaces, incinerators, evaporative burners, plasma burner systems, plasma arc, stationary burners and the like which can combust or in which can be combusted a hydrocarbonaceous fuel. The combustion units effective in the utilization of the present invention include any and all burners or combustion devices, including for example and without limitation herein, stationary burners, waste incinerators, diesel fuel burners, gasoline fuel burners, power plant generators, power plant furnaces, and the like. The hydrocarbonaceous fuel combustion units that may benefit from the present invention include all combustion units, systems, devices, and/or engines that burn or oxidatively decompose hydrocarbonaceous fuels.

Fuels suitable for use in the operation of combustion units of the present invention include hydrocarbonaceous fuels such as but not limited to diesel fuel, jet fuel, alcohols, ethers, kerosene, low sulfur fuels, synthetic fuels, such as Fischer-Tropsch fuels, liquid petroleum gas, fuels derived from coal, coal, genetically engineered biofuels and crops and extracts therefrom, natural gas, propane, butane, unleaded motor and aviation gasolines, and so-called reformulated gasolines which typically contain both hydrocarbons of the gasoline boiling range and fuel-soluble oxygenated blending agents, such as alcohols, ethers and other suitable oxygen-containing organic compounds. Other fuels that are useful in the methods and combustion units of the present invention are gasoline, bunker fuel, coal (dust or slurry), crude oil, refinery "bottoms" and by-products, crude oil extracts, hazardous wastes, yard trimmings and waste, wood chips and saw dust, agricultural waste, fodder, silage, plastics and other organic waste and/or by-products, and mixtures thereof, and emulsions, suspensions, and dispersions thereof in water, alcohol, or other carrier fluids. By "diesel fuel" herein is meant one or more fuels selected from the group consisting of diesel fuel, biodiesel, biodiesel-derived fuel, synthetic diesel and mixtures thereof.

Oxygenates suitable for optional use in the present invention include methanol, ethanol, isopropanol, t-butanol, mixed alcohols, dimethoxy ethane (DME), methyl tertiary butyl ether, tertiary amyl methyl ether, ethyl tertiary butyl ether and mixed ethers. Oxygenates, when used, will normally be present in the reformulated gasoline fuel in an amount below about 25% by volume, and preferably in an amount that provides an oxygen content in the overall fuel in the range of about 0.5 to about 5 percent by volume.

Thus, in an embodiment the present invention provides a method to inhibit corrosion at a temperature less than 250° C. in the exhaust passageway of a combustion unit combusting a fuel, said method comprising adding to the combustion a corrosion-inhibiting amount of manganese.

Another feature of the present invention is to provide lower maintenance time, materials, and costs due to reduced low and high temperature corrosion occurring in the burner or combustion units. Thus is provided a method to reduce corrosion in the combustion unit and/or its exhaust passageway which contains steel, iron or other corrosion-prone materials in a combustion unit combusting fuel and a manganese source.

A further feature of the present invention is to provide a method of tying up elements, such as vanadium, iron, sulfur, and phosphorus, which can otherwise poison the catalytic activity of a catalysed fuel combustion system.

Accordingly, the present invention relates in another embodiment to use in a fuel-borne organometallic emissions control catalyst system of manganese as a co-catalyst, whereby the organometallic catalyst is rendered more effective to improve carbon burnout in either the combustion chamber or the exhaust stream, or both, where the temperature is above about 250° C.

The present invention also relates in another embodiment to use in a fuel-borne organometallic emissions control catalyst system of manganese as a co-catalyst, whereby the organometallic catalyst is rendered more effective to control corrosive sulfur trioxide production in either the combustion chamber or the exhaust stream, or both, where the temperature is above about 250° C.

Additionally, the present invention provides a combustion system having a fuel-borne organometallic emissions control combustion catalyst, wherein a fuel contaminant preferentially reacts with a manganese co-catalyst rather than the organometallic catalyst. In this manner, scavenging of the contaminant by the manganese is achieved.

In yet another embodiment, the present invention provides a method to passivate metal surfaces containing $Fe_2O_3$ within a combustion unit combusting a fuel, wherein the surfaces are exposed to the product of the combustion, and the method includes adding a sufficient amount of a source of manganese to the combustion, whereby the manganese reduces at least some of the $Fe_2O_3$ to $Fe_3O_4$, whereby the metal surface is passivated.

The present invention further relates to methods to retard, impede or prevent the oxidation of $SO_2$ to $SO_3$, since $SO_3$ is an undesirable combustion by-product. According to one embodiment of the present invention, the use of manganese in the combustion process or immediately thereafter prevents the undesired oxidation of $SO_2$ to $SO_3$, usually catalysed by iron, platinum, and/or vanadium often found in combustion products. This has the beneficial effect of reducing or eliminating the production of acid rain-causing $SO_3$ from the combustion of hydrocarbonaceous fuel.

Thus, in yet another embodiment of the present invention is provided a method of improving the efficiency of fuel-borne organometallic combustion catalysts utilized in a fuel combustion system, comprising adding to a fuel having one or more contaminants selected from sulfur, vanadium, iron and phosphorus an amount of manganese sufficient to, upon combustion of the fuel, interact with at least one of the contaminants.

It is to be understood that both the foregoing general description and the following detailed description are exemplary and explanatory only and are intended to provide further explanation of the present invention, as claimed.

DETAILED DESCRIPTION OF THE PRESENT INVENTION

Thus, according to one embodiment of the present invention, the manganese can be added to the main catalyst package as a co-catalyst. The main catalyst package may be composed of one or more individual organometallics compounds of Li, Na, K, Mg, Ca, Sr, Ba, Mo, Fe, Co, Pt, Ce, and combinations or mixtures, or precursors thereof. The intended purpose of the catalyst is environmental pollution control by promoting carbon burnout in combustion particulate byproducts such as soot and smoke (particulate matter or PM), and in some instances control of hydrocarbon (HC), carbon monoxide (CO), and oxides of nitrogen ($NO_x$) emissions. To the fuel treated with this catalyst package can be added, for example and without limitation, between 2-18 mg Mn/liter fuel when used in internal combustion engines, and between 2-200 ppm v/v Mn/liter fuel when used in atmospheric burners such as those found in industrial furnaces, home heating, and utility power generation furnaces.

According to one embodiment of the present invention, a preferred manganese source is methylcyclopentadienyl manganese tricarbonyl, available from Ethyl Corporation as MMT® Gasoline Additive, or HiTEC® 3000 Performance Additive, or GREENBURN® Fuel Additive.

In internal combustion engines, manganese in a fuel combines with, reacts with, inactivates or otherwise ties up catalysts poisons, such as sulfur and phosphorus, hence leaving a cleaner or clean combustion environment in which the fuel-borne organometallic catalyst can function with surprisingly improved efficiency.

Carbon/Hydrocarbon Burnout and Carbon Monoxide Removal

Most organometallic-containing fuel additives decompose in the flame to give the respective metal atoms. The level of fuel air mixedness at the time of combustion is non-homogeneous because ignition occurs while the fuel is being injected and combustion heat radiates back into the fuel core as it is being injected, causing pyrolysis reactions of the fuel in this fuel-rich zone. The pyrolysis products form soot nucleation sites that grow into visible soot by coagulation and agglomeration mechanisms. As combustion takes place, manganese atoms from the thermal decomposition of the manganese-containing fuel additive collide with one another and with the fuel pyrolysis products, which are coagulating and agglomerating into visible soot. The metal atoms also collide with oxygen according to the schematic reaction below.

$$M(atomic) + \tfrac{1}{2}O_2 \longrightarrow MO$$

Any collisions between metal atoms (i.e. Pt, Fe, Ce, Mn, etc) in the combusting environment are non elastic (this is the nature of "naked" metal atom collisions) and lead to reduced dispersion of the metal in the combusting gases. However, collisions of metal atoms with fuel pyrolysis products as they agglomerate maintains the dispersion by charging the particles, resulting in soot particles that are impacted with highly dispersed metal atoms and with clusters thereof that might have formed prior to collision with soot particles. As this process transpires, the level of mixedness increases, and at temperatures above 400° C. thermal oxidation of the soot occurs as fast as oxygen collides with these particles. The rate of this oxidation is temperature dependent, slowing down as the temperature fall below 400° C. However, particles with metal atoms impacted continue to oxidize at a high rate due to carbon oxidation catalyzed by carbon dioxide and the metal catalyst species as shown in the following equations.

$$MO_x + CO \longrightarrow MO_{x-1(cat)} + CO_2$$

$$C(\text{on soot particle}) + CO_2 + MO_{x-1(cat)} \longrightarrow 2CO + MO_{x-1(cat)}$$

$$MO_{x-1(cat)} + \tfrac{1}{2}O_2 \longrightarrow MO_x$$

This "carbon burnout" reaction catalyzed by metal oxides according to the above three equations can be sustained to temperatures as low as 250° C. Finally, the carbon monoxide thus formed is further oxidized to carbon dioxide as oxygen abundance increases in the combusting mixture due to increasing level of mixing with time. This builds up the level of $MO_x$ according to the reaction equations, $$MO_{x-1(cat)} + \tfrac{1}{2}O_2 \longrightarrow MO_x$$

$$MO_x + CO \longrightarrow MO_{x-1(cat)} + CO_2$$

The reaction cycle above is oxygen concentration dependent and will continue to take place in the combustion gases all the way to temperatures as low as 250° C. These carbon burnout, hydrocarbon oxidation and carbon dioxide removal reactions catalyzed by fuel borne organometallic catalysts such as compounds derived from Pt, Fe, Ce, etc. can be inhibited by fuel components bearing sulfur, phosphorus, vanadium, lead, etc. which react with and deactivate these catalysts.

By the present invention, a manganese compound can be added to the main catalyst package as a co-catalyst to scavenge these "poisons" from the combustion environment thus optimizing the performance of the main fuel-borne organometallic catalyst in promoting carbon burnout in combustion particulate byproducts.

In another embodiment, the manganese compound is not added to the main catalyst package directly, but is subsequently and/or separately introduced to the combustion unit or combustion byproducts therefrom.

In stationary burners the manganese in addition to combining with, reacting with, inactivating, or otherwise tying down sulfur and phosphorus, also inhibits $SO_2$ to $SO_3$ oxidation generally facilitated by Fe or Pt. The $SO_3$ hydrates in the exhaust stream as the temperatures drop below the dew point to give sulfuric acid that results in serious tail end corrosion in the exhaust stack. This so-called "low temperature corrosion" is minimized herein by the addition of a sufficient amount of a source of Mn in cases where the fuel-borne catalysts (i.e. Fe and Pt) or surface contaminants (e.g. Fe and oxides thereof) are known to also catalyze the $SO_2$ to $SO_3$ reaction.

Stationary burner furnaces also suffer from high temperature corrosion that is mainly caused by high iron and vanadium levels in the fuel that form low melting iron derivatives, and vanadylvanadate fluxes with alkali and alkaline earth metals that may be added as fuel-borne combustion and emissions catalysts. Co-addition of manganese inhibits formation of low-melting alkali/alkaline earth metal vanadylvanadates by reacting with the oxygen necessary for the formation of these low melting fluxes. These fluxes corrode surfaces in the high temperature zone of stationary burner furnaces leading to frequent expensive maintenance work. An increase in vanadium and iron in the fly ash is a diagnosis of this high temperature corrosion. When manganese is added to the fuel according to the present invention, there is a decrease in these elements in the fly ash thereby indicating a decreased level of high temperature corrosion.

Optimization of Catalytic Activity and Prevention of Low-Temperature Corrosion.

Sulfur trioxide ($SO_3$) produced in the combustion of hydrocarbonaceous fuels combines with water vapor to form sulfuric acid as the temperature of the exhaust cools down below the dew point of water. The presence of this acid results in both low temperature corrosion of exhaust equipment and in corrosive environmental pollution (acid rain). In atmospheric (stationary) burners, the corrosion of exhaust equipment can be quite considerable in terms of cost and down time for repairs. Fuel-borne metallic catalysts convert sulfur dioxide ($SO_2$) to sulfur trioxide at very high rates. The efficiencies of some of these reactions are shown below. Surface metal catalyzed heterogeneous reactions of $SO_2$ to $SO_3$ have been summarized by Salooja as follows.

| Reaction | Conversion Efficiency |
|---|---|
| $SO_2 + \frac{1}{2}O_2\ (Pt_{cat}) \longrightarrow SO_3 + (Pt_{cat})$ | 100% |
| $SO_2 + \frac{1}{2}O_2\ (V_2O_{5cat}) \longrightarrow SO_3 + (V_2O_{5cat})$ | 85% |
| $SO_2 + \frac{1}{2}O_2\ (Cr_2O_{3cat}) \longrightarrow SO_3 + (Cr_2O_{3cat})$ | 80% |
| $SO_2 + \frac{1}{2}O_2\ (Fe_2O_{3cat}) \longrightarrow SO_3 + (Fe_2O_{3cat})$ | 65% |
| $SO_2 + \frac{1}{2}O_2\ (CuO_{cat}) \longrightarrow SO_3 + (CuO_{cat})$ | 58% |

The conversion efficiencies shown are achieved at temperatures of: 450° C. (Pt), 520° C. ($V_2O_5$), 575° C. ($Cr_2O_3$), 620° C. ($Fe_2O_3$), and 680° C. (CuO). (Salooja, K. C., *Burner Fuel Additives. Journal of the Institute of Fuel*, 37, p. 37, 1972.)

Platinum thus provides extremely efficient conversion of $SO_2$ to $SO_3$. This metal is used commercially at very low treat levels (2-4 ppm) in diesel as a fuel-borne catalyst for control of particulate and NOx emissions. When it reacts with $SO_2$ to form undesirable $SO_3$, the reaction goes further to form $PtSO_4$ which is inactive towards its intended PM and $NO_x$ control. When this fuel-borne catalyst is formulated with a manganese co-catalyst according to the present invention, the manganese will keep the sulfur away from the platinum by forming a sacrificial $MnSO_4$, thus maintaining the performance of the platinum at its optimum. In the case of iron, the active form in converting $SO_2$ to $SO_3$ is $Fe_2O_3$. The manganese used in this invention inhibits this reaction by reducing this active iron species to the less sulfur active $Fe_3O_4$ lower oxidation state form as shown below.

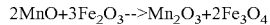

$2MnO+3Fe_2O_3 \longrightarrow Mn_2O_3+2Fe_3O_4$

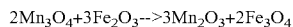

$2Mn_3O_4+3Fe_2O_3 \longrightarrow 3Mn_2O_3+2Fe_3O_4$ $Fe_3O_4$ does not promote the oxidation of $SO_2$ to $SO_3$. Since $Fe_2O_3$ but not $Fe_3O_4$ catalyzes thermal oxidation of $SO_2$ to $SO_3$, surface catalysis of $SO_2$ to $SO_3$ is eliminated or inhibited by the use of Mn in the present invention. And $SO_3$ formed by other reaction means within the combustion unit will react with MnO according to the reaction described by Gray below.

$MnO+SO_3 \longrightarrow MnSO_4$ [Melting point of $MnSO_4$ is 700° C.]

(Gray, M. A., "*The Effect of a Volatile Fireside Manganese Additive on Coal-Fired Utility Boiler Operation,*" *ASME presentation at the Joint Power Generation Conference*, Phoenix, Ariz., Sep. 28 to Oct. 2, 1980).

Thus, the present invention provides in one embodiment a method to passivate metal structural surfaces within combustion units, which surfaces might otherwise catalyze the oxidation of $SO_2$ to $SO_3$. This passivation of iron and steel surfaces by manganese against catalyzing the $SO_2$ to $SO_3$ oxidation reaction is important in utility steam furnaces where the surface area presented to the combustion products is by design very large in order to extract maximum heat from the flue gases to generate steam.

In another embodiment, the present invention prevents or inhibits the oxidation of $Fe_3O_4$ to $Fe_2O_3$ on a surface of a combustion unit. A manganese co-catalyst added with the fuel-borne catalyst according to an embodiment of the present invention maximizes the protective effect by ensuring the highest probability of the manganese being juxtaposed to the fuel-borne catalyst during the combustion and exhaust phases. Other fuel-borne catalysts poisons such as phosphorus, vanadium, etc. would be similarly inhibited or scavenged by the manganese.

High Temperature Corrosion

One skilled in the art can expect high temperature corrosion to occur if the fuel used contains sodium (Na), and/or vanadium (V), since highly corrosive complex oxides of these species such as "$5Na_2O.V_2O_4.11V_2O_5$" (sodium vanadylvanadates) form on utility furnace surfaces in the temperature range between 550 and 680° C. These low melting oxides are efficient as 1) $SO_2$ to $SO_3$ conversion catalysts, and 2) oxygen transport catalysts from the gas phase to the iron surface of the unit. A manganese co-catalyst added with the fuel-borne catalyst (Pt, Fe, Ce, etc.) would preferentially scavenge the oxygen from the surface deposit and utilize it in the carbon burnout reactions. This would inhibit oxidation of higher melting sodium vanadylvanadates to their more corrosive lower melting analogues which are responsible for high temperature corrosion by forming a eutectic flux with the utility furnace and pipes surfaces resulting in surface erosion. (See, for example, Pollman, S., Mineralogisch kristallographische Untersuchungen an Schlaken und Rohrbelägen aus dem Hochtemperaturbereich ölgefeuerter Großkessel. VGB-Mitteilungen, 94, p. 1, 1965. Volker Hoenig, L., "Untersuchung der Wirkungsmechanismen von Additiven für shweres Heizöl". Fortschritt-Berichte VDI, Reihe 15. Umwelttechnik, Nr. 84, pp. 57-59 and references therein, Düsseldorf VDI-Verlag 1991, and Wahnschaffe, E., *Kontinuierliche $SO_3$- und Taubereichsmessunged auf ölgefeurten Dampferzuegern*. Mitteilungen der VGB, Heft 3, p. 193, 1968.)

The following examples further illustrate aspects of the present invention but do not limit the present invention.

EXAMPLES

When fuel-borne organometallic combustion control catalysts including a manganese source were utilised in a power plant generator burning #6 fuel oil according to an embodiment of the present invention, emission filters showed declining particulate mass with time. Specifically, a reduction in electrostatic precipitator ash as carbon of up to and including 38% by mass was observed.

Another measure of the effectiveness of reduced ash production is the observed trend of increasing efficiency such as resistivity as loss on ignition of an electrostatic precipitator fly ash decreases. This is because the carbon deposits act as a conductor on the electrostatic precipitator and resistivity is increased as carbon deposition and deposits are decreased. The overall efficiency of the combustion unit is increased according to the present invention by burning more particulate hence reducing the deposition of carbon ash.

The present invention is particularly effective in reducing the amount of vanadium and iron in the fly ash resulting from the combustion of fuel oil, such as for example #6 fuel oil, in a power plant furnace.

Figure 2:
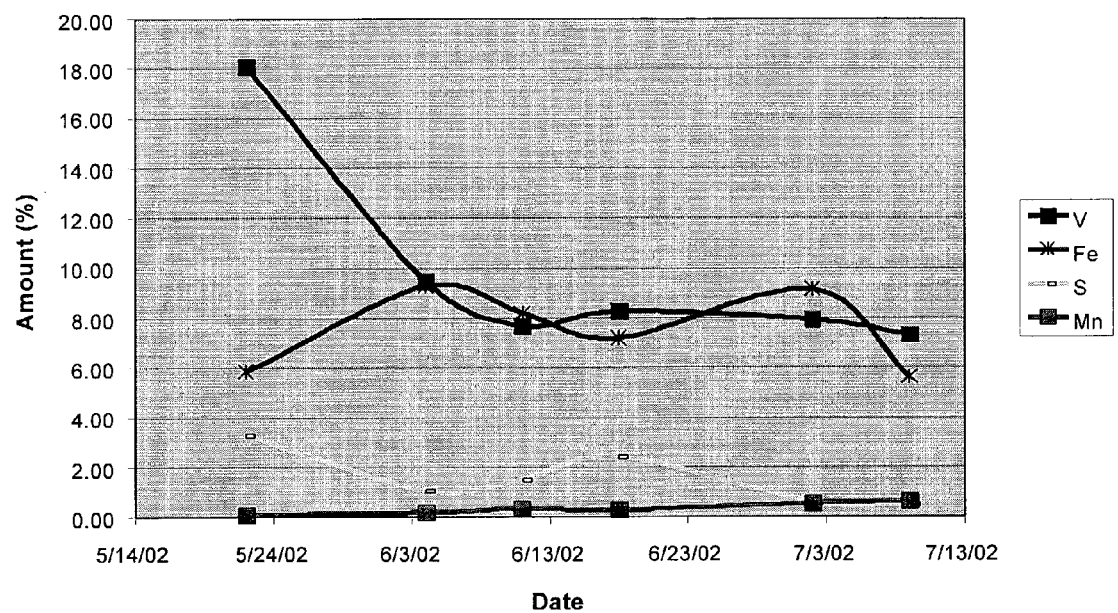

The present invention is particularly effective in lowering high- and low-temperature corrosion in steam utility power generator furnaces combusting a fuel oil as demonstrated by the modified composition of the fly ash and bottom ash shown in FIGS. 1 & 2. High temperature corrosion from the combustion of fuel oils loads these ashes with iron, sulfur, and vanadium. The iron comes from surface corrosion in the furnace and steam pipes surfaces.

FIG. 1 shows a decrease in fly ash iron content as duration of manganese use increases from the combustion of #6 fuel oil according to the present invention. The sulfur level in the ash is also lowered showing that the manganese is inhibiting oxidation of $SO_2$ to $SO_3$ and the $SO_3$ would form either metallic sulfates on reaction with other fuel-borne and system surface metals, or form sulfuric acid on reaction with combustion water leading to low temperature corrosion. A decreasing amount of iron in the ashes is indicative of a lowering in high temperature surface corrosion, and a decreasing ash sulfur level is indicative of less sulfuric acid formation in the flue gases.

FIG. 2 supplements the results in FIG. 1 by showing a corresponding decrease in vanadium and sulfur in the bottom ash resulting from the combustion of #6 fuel oil. These decreases in iron, sulfur, and vanadium in the ashes do not trend with the respective levels in the fuel oil used. The corresponding levels of sulfur and vanadium in the fuel oil used were actually trending up with time, hence demonstrating even more the unexpected efficacy of manganese to control the fate of these contaminants in the combustion system according to the present invention.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method to inhibit corrosion of a combustion unit combusting a fuel, wherein the corrosion is caused by combustion byproducts, said method comprising adding to the combustion a corrosion-inhibiting amount of a manganese source, wherein the manganese is selected from the group consisting of methyl cyclopentadienyl manganese tricarbonyl, cyclopentadienyl manganese tricarbonyl, bis-cyclopentadienyl manganese (manganocene), bis-alkyl cyclopentadienyl manganese, alkyl cyclopentadienyl manganese tricarbonyl, organic manganese tricarbonyl derivatives, alkyl cyclopentadienyl manganese derivatives, and combinations and mixtures thereof, the corrosion occurring at a temperature below 250° C. during the operation of the combustion unit, and wherein the combustion unit is selected from the group consisting of non-evaporative stationary burners, power plant generators, power plant furnaces, boilers, furnaces, plasma burner systems, and plasma arc combustion units.

2. The method of claim 1, wherein the corrosion also occurs at a temperature above 400° C.

3. The method of any one of claim 1 or 2, wherein the fuel is selected from the group consisting of diesel fuel, biodiesel, biodiesel-derived fuel, synthetic diesel, jet fuel, alcohols, ethers, kerosene, low sulfur fuels, synthetic fuels, Fischer-Tropsch fuels, liquid petroleum gas, fuels derived from coal, coal, genetically engineered biofuels and crops and extracts therefrom, natural gas, propane, butane, unleaded motor and aviation gasolines, reformulated gasolines which contain both hydrocarbons of the gasoline boiling range and fuel-soluble oxygenated blending agents, gasoline, bunker fuel, coal (dust or slurry), crude oil, refinery "bottoms" and by-products, crude oil extracts, hazardous wastes, yard trimmings and waste, wood chips and saw dust, agricultural waste, fodder, silage, plastics, organic waste, and mixtures thereof, and emulsions, suspensions, and dispersions thereof in water, alcohol, and other carrier fluids.

\* \* \* \* \*